(12) United States Patent
Sellars

(10) Patent No.: US 6,203,635 B1
(45) Date of Patent: Mar. 20, 2001

(54) BEVEL BONDING METHOD

(76) Inventor: Michael John Sellars, 47 Rushton Terrace, Mount Nasura, Perth, NA6111 (AU)

(*) Notice: Subject to any disclaimer, the term of this patent is extended or adjusted under 35 U.S.C. 154(b) by 0 days.

(21) Appl. No.: 09/176,134

(22) Filed: Oct. 21, 1998

(30) Foreign Application Priority Data

Oct. 22, 1997 (GB) .................................... 9722150
Mar. 27, 1998 (GB) .................................... 9806503

(51) Int. Cl.$^7$ .................................................. B44F 1/06
(52) U.S. Cl. .................... 156/63; 156/248; 156/275.5; 156/295; 156/297; 428/38
(58) Field of Search .................. 156/63, 62, 100, 156/248, 295, 289, 297, 299, 275.1, 275.5; 427/272, 282; 428/38; 118/213, 505; 52/311.2, 311.1

(56) References Cited

U.S. PATENT DOCUMENTS

| | | |
|---|---|---|
| 3,349,158 | 10/1967 | Maynard . |
| 4,418,284 | * 11/1983 | Ogawa et al. ................. 156/275.5 |
| 4,612,075 | 9/1986 | Waugh et al. . |
| 5,098,760 | 3/1992 | Fletcher . |
| 5,129,990 | * 7/1992 | Binnie, Jr. et al. .................. 156/295 |
| 5,252,166 | 10/1993 | Krawczyk . |
| 5,330,262 | * 7/1994 | Peters ................................. 312/140.4 |

FOREIGN PATENT DOCUMENTS

0317524 A2   5/1989   (GB) .
2303583      2/1997   (GB) .

OTHER PUBLICATIONS

Patent Abstract of Japan vol. 013, No. 211, May 17, 1989, and Japanese Application No. 01028253 A (Techno Glass: KK).

* cited by examiner

Primary Examiner—Geoffrey L. Knable
(74) Attorney, Agent, or Firm—Head, Johnson and Kachigian

(57) ABSTRACT

The invention relates to the bonding of bevels of relatively planar form and of material such as glass to a sheet of material such as a window pane or the like to provide a decorative effect. The invention provides in one aspect the use of a template which has at least one aperture in which one or a series of bevels are placed in the correct configuration. The template is formed so as to allow excess adhesive to flow onto the same rather than the sheet material so that when the adhesive is cured it can be peelably removed from the template rather than cause deposits on the sheet material. The adhesive used can withstand and be resistant to the effects of weathering over a prolonged period of time thereby improving the long term visual effect of the bevels when bonded to the sheet material.

11 Claims, 2 Drawing Sheets

BEVEL BONDING METHOD

The invention which is the subject of this application is related to the bonding of relatively planar pieces of glass or plastics material, known as bevels, to planar surfaces such as windows and panes of glass, and sheet material in general, to provide a decorative effect. Typically, the bevels are shaped so as to be used to provide decorative effect independently or in combination with other bevels when attached by a resin to the pane.

At the present time the conventional method for bonding a cluster of bevels is to hold the sheet material in a horizontal plane and then for each bevel, position the same on the glass with a layer of adhesive between the bevel and the glass. The bevel is pushed onto the glass to squeeze and remove air entrapment and excess adhesive, which is forced to the edges of the bevel. Ultra violet light is passed over the bevel which acts to cure the adhesive and bond the bevel to the glass surface. However, the curing process also hardens the excess adhesive which is then required to be cut and be removed from the glass using glass cleaning preparations before the next bevel is applied. This cleaning process can leave deposits on the glass surface which affect the appearance of the glass, and the deposits can migrate under the bevel to attach the adhesive which bonds the bevel to the sheet material and cause defects, delamination. Furthermore, the removal of the cured excess adhesive is difficult to perform neatly and is time consuming. This process is then repeated for each bevel, which typically abuts the previously bevel. The process is therefore repeated a number of times and, when one considers that certain decorative effects require upwards of twenty bevels to be applied, one after the other, it will be appreciated that the conventional process is not ideal and can take up a considerable amount of time.

The applicant has a co-pending application which offers one solution to the problems of the conventional method by spot curing the bevel in position prior to the general curing of the adhesive but this process can be time consuming and as such is not always appropriate for use.

The aim of the current invention is to provide a method and apparatus which allow the bonding of bevels to a surface to be performed quickly, accurately and securely and to minimise the need for removal of excess cured adhesive from the surface once the bonding process is completed. Another aim is to achieve the improvements without affecting the quality or visual appearance of the bond between the bevel and the surface.

In a first aspect of the invention there is provided a method of bonding a plurality of bevels to a planar surface to form a decorative effect, said method comprising the steps of placing said bevels in position on the surface to form a cluster of said bevels and a decorative effect, with a layer of adhesive applied between said bevels and surface; applying pressure to said bevels to move excess adhesive and/or entrapped air to the edge of said cluster of bevels; and applying a curing medium to cure said adhesive and bond the bevels to the surface and; characterised in that a template is placed on the surface prior to the bonding, said template having an aperture or apertures of a shape which matches that of the required bevel cluster and into which the bevels are placed to form the cluster prior to bonding.

Typically the surface is a surface of sheet material such as glass or plastics material which is transparent.

Typically the template is formed such that when the bevel cluster is formed in the aperture and pressure is applied to the bevels to move the excess adhesive to the edge of the cluster, the excess adhesive flows onto the template to lie thereon during curing. Once cured the excess adhesive is scored out around the bevel cluster perimeter. This allows the template to be removed from the surface with the excess adhesive bonded to it and the cured excess adhesive can then simply be peeled from the template.

In a preferred embodiment the template is provided so that it can be releasably secured to the surface, at least around the perimeter of the aperture, to help reduce the risk of excess adhesive being forced underneath the template and being difficult to remove, once cured. One suitable material for the template has been found to be a plasticised vinyl sheet.

Preferably the template is formed from an Ultra-Violet or other suitable photo-initiating light transmitting plastics sheet which is typically a clear material.

Typically the outline of the aperture matches, but is slightly larger than, the outline of the cluster of bevels to give the desired effect. In use, the fit between the template aperture and bevel cluster, when formed to fit in the aperture in the required shape, is such that there is a minimum gap between the outline of the template aperture and the edge of the bevel cluster. With the template in position, the bevels are pressed onto the surface and at least a portion of the excess adhesive may pass onto the surface of the template rather than onto the surface to which the bevels are to be bonded. The excess adhesive can subsequently be removed from the template if the template is required to be used again. The use of the template thereby helps to minimise the amount of excess adhesive which is required to be removed from around the edge of the bevels. Additionally the template aperture allows the positioning of the bevels to form the bevel cluster to be aided.

In a further feature of the invention a photo initiating resin adhesive is used which can be through cured even when on the template by the application of light from a curing medium such as an ultra violet light source, thereon.

By the term through cure is meant that the resin is cured though the extent of the depth of the same so that the entire resin layer has a relatively solid form. This relatively solid form in turn allows the cured resin to be peelably removed from those areas where it is not required i.e. on the template.

In a preferred use of the resin the same is preferably provided to be through cured within a time of 0–20 seconds from commencement of curing thereby allowing the same to be ready to be removed relatively quickly and, as it is peelably removable from the template for the bonding method for the bevel to the pane to be completed quickly.

The ability to cure the resin of the invention in the manner set out and using a photo initiating light source is achieved by assessing the particular characteristics of the light source and light emitted, which is to be used. There is then included in the resin an initiator component for curing which is best suited to the particular light source characteristics.

In one embodiment of the invention there is provided a further template, said template positioned on the surface of the sheet material opposing the surface to which the bevels are to be applied and viewable through said sheet material. The template typically includes a series of lines relating to the outline of the bevels which are to be applied and which shows the relative position of each of the bevels.

In one embodiment, the areas defining the shape of each of the bevels on the further template are darkened, with the outline of the bevels shown as lighter lines, said darkened areas provided to indicate foreign matter, trapped air, excess adhesive and the like more clearly, and said template removed during the curing of the adhesive.

The curing medium used is typically an ultra violet light or other suitable photo initiating light source and, in one preferred embodiment is shone through the sheet material onto the faces of the bevels which are in contact with the surface to which they are to be bonded. This ensures that the light is applied through and onto substantially planar surfaces and thereby improves the standard of bond formed and overcomes any problems caused by reflection of the light by the bevels, which particularly occurs when curing from above onto what is typically a shaped face of the bevels as where the bevels edges abut, UV light is reflected back out and causes inferior bonds.

In a further aspect of the invention there is provided a method of bonding at least one bevel to a surface, said method comprising placing the bevel in the required position on the surface with a layer of adhesive between said bevel and surface, applying pressure to the bevel to move any excess adhesive and/or entrapped air to the edges of said bevel, and applying a curing medium to cure said adhesive and bond the bevel to the surface, and wherein, an area surrounding, and adjacent to the edges of the bevel, is rendered to a condition such that, when the curing medium is applied the curing effect of the same on any adhesive which lies in the said area is significantly reduced.

The method may also be followed for a bevel cluster.

In one embodiment the area on the surface to which the bevel is applied is darkened such that the curing medium in the form of ultra violet light cannot pass through the same and therefore does not cure the adhesive. This allows the adhesive, which is excess adhesive, to be subsequently manipulated in a substantially fluid state which is significantly easier than if the same was cured. In one embodiment the area is formed by applying a material, such as ink, in a line onto a surface of the sheet material around the edges of the bevel. One preferred method of applying the ink is to first place the bevel to be bonded on the opposing surface of the sheet material to that to which it is to be bonded, and draw around the outline of the bevel with a pen, which may be specially adapted, to form a relatively thick darkened line around the outline. This acts to form the required darkened area and also acts as a positioning means. The bevel, which may be provided to be slightly raised from the surface by supports, is then removed and placed on the surface to which it is to be bonded with a layer of adhesive and is positioned so that it lies within the area defined by the ink line viewed through the sheet material. The bevel is then pressed to move excess adhesive to the edge and this adhesive then lies within the area defined by the ink line, albeit on the opposing surface of the sheet material. However as the curing medium is applied from the opposing surface through the sheet material, so the ink line prevents the curing medium from reaching the excess adhesive and the same can be retained in a fluid state to allow further bevels to be abutted against the now bonded bevel without the need to remove any cured adhesive. It is preferred that the ink line may define an outline which is slightly smaller than the outline of the bevel itself. For large bevel clusters the bonding of this first bevel ensures that a precise location of this initial bevel is achieved, and so subsequent bevels applied thereafter can be located without the excess adhesive being cured and abutted to the first bevel ensuring accurate and precise alignment of the same can be achieved.

In an alternative embodiment, the said area is formed on the template around the aperture edge which is positioned on the surface and in register with the bevel cluster. In a further embodiment the area is formed on the further template around the outline of the bevel which is to be applied to the surface.

In a further embodiment an area of the sort described can be formed around the outline of the whole bevel cluster when positioned, with any template removed and prior to the application of the curing medium over the bevels which are still to be cured.

In a further aspect of the invention there is provided a method of bonding a plurality of bevels to a planar surface to form a decorative effect, said method comprising the steps of; placing a first bevel on the surface to which it is to be bonded, with a layer of adhesive between said bevel and surface; applying pressure to said bevel onto the surface to remove any entrapped air and/or excess adhesive to the edge of said bevel; applying a curing medium to cure at least a portion of the adhesive and bond the bevel to the surface; removing excess adhesive; and wherein the remaining bevels are positioned on the surface with respect to the bonded bevel to form the required decorative effect, with a layer of adhesive between said bevels and the surface and pressure applied to said bevels to remove excess adhesive and/or entrapped air, and the curing medium applied over said plurality of bevels to cure and bond the same in position.

In one embodiment the bevel is spot cured to the surface, or alternatively, the entire bevel may be cured to be bonded to the surface.

in a further embodiment of the invention, a template may include an area to reduce the curing effect of the curing medium, said area being of the size and shape of the first bevel such that when the remaining bevels are positioned and are to be cured, the template is retained in position so that the curing medium, when applied does not cure the adhesive of the previously applied bevel.

In a further aspect of the invention there is provided a resin adhesive which can be cured by applying light from a light source thereon, characterised in that said resin is formulated with reference to the known characteristics of the light and which is capable of photo initiating the curing of the resin through a template of plastics sheet material which allows transmission of the light therethrough and said resin includes an initiator component and/or other components which are suited and matched to the light and plastics sheet template characteristics so as to allow through curing of a layer of resin adhesive lying between at least one bevel and a surface to which same is to be applied by applying the light thereon.

In one embodiment the resin adhesive is formulated so that it has similar optical characteristics of glass. It is produced from a blend of Polyester, Urethane, Acrylate, and Methacrylates with a photoinitiating mechanism, which combination provides the desired through curing of the adhesive.

Typically the photoinitiating mechanism is designed to ensure the through curing of the adhesive to be achieved within 20 seconds of commencing the curing process, the adhesive is formulated so that when cured, it has elastomeric characteristics, and is capable of being readily removed from the top template.

Typically the adhesive is formulated to ensure that it can withstand long term exposure to thermal, ultra violet and moisture degradation. To this cause the adhesive is capable of withstanding in excess of 1000 hours cyclic weather testing to the standard ASTM G 53–96. Thereafter the adhesive maintains its required optical and adhesive properties.

Specific embodiments of the invention will now be described with reference to the accompanying drawings wherein.

Figure 1:
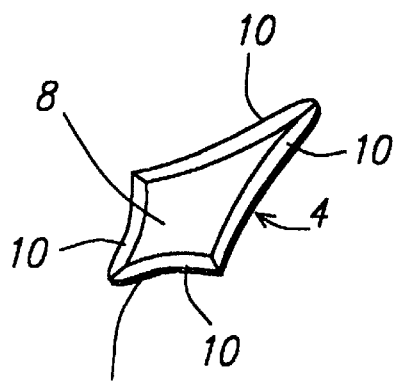
FIG. 1 illustrates a perspective view of a bevel of one design.

Referring firstly to FIG. 1 there is shown an item of glass or plastics material for use in creating a decorative effect, said item referred to hereon in as a bevel 2. The bevel is typically transparent, but may also be of coloured material can be of any desired outline and has a smooth rear surface 4 and a front surface 6 which comprises a raised portion 8 and downwardly sloping edge portions 10.

Figure 2:
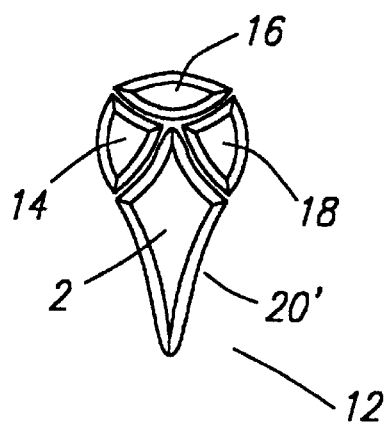
FIG. 2 illustrates a decorative effect created using a plurality of bevels bonded to a surface.
Figure 3:
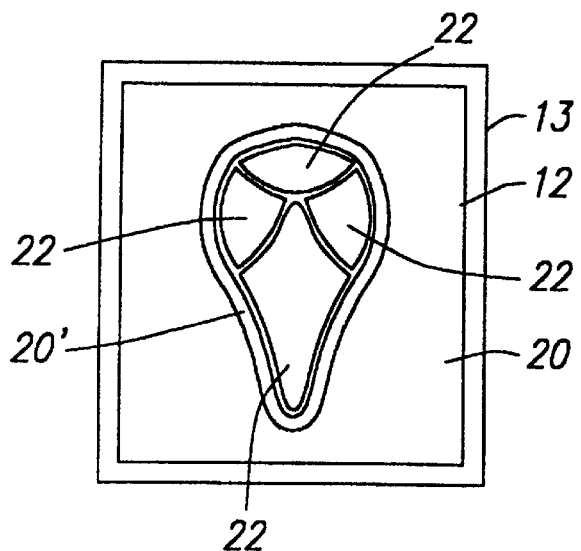
FIG. 3 illustrates an embodiment of the further template of the invention for use to create the effect of FIG. 2.

The rear surface 4 is provided to be bonded to the surface 12 as shown in FIG. 2 on which the decorative effect is to be created, said surface typically that of glass or plastics sheet material for use as, for example, a window. Normally the bevel is used in conjunction with other bevels to create a bevel cluster with an outline 20' and a decorative effect, one design of which is shown on FIG. 2. In this example, four bevels, 2, 14, 16, 18 are used and bonded to the surface 12. It will be seen that the bevels abut one another as is commonly the case and therefore it is important that any excess adhesive is prevented from being cured or partially cured on the surface.

Figure 4:
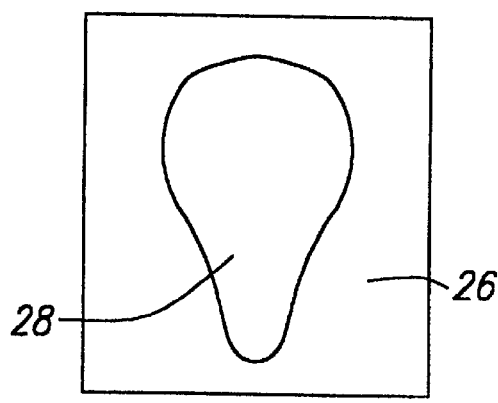
FIG. 4 illustrates an embodiment of the template with aperture for use to create the decorative effect of FIG. 2.

In one embodiment of the method according to the invention, the template 26 and further template 20 can be used. The further template 26 aids the positioning of the bevels and carries the outline 20' of the bevel cluster as well as each of the bevels 2, 14, 16, 18 in the required relative positions. The template is positioned on the surface opposing that to which the bevels are to be bonded and is viewable through the sheet material. The template 26 shown in FIG. 4 has an aperture 28 which is of the outline 20' of the bevel cluster and this is placed in position on the surface 12 to which the bevels are to be bonded. The template is positioned in register with the outline 20' of the template 20.

With the templates in position the bevels are positioned in the aperture 28 on the surface 12 with a layer of adhesive between said bevels and the surface in line with the template. The further template 20 is darkened in the areas 22 defined by the bevel outlines so that, when viewed, any foreign matter on the surface 12, trapped air and excess adhesive between the surface and bevels can be more clearly seen and forced to the edge of the bevel cluster.

The template 26 aperture 28 is of a shape which matches the outline 20' of the edge of the bevel cluster but is slightly larger. Thus as the bevels are pressed onto the surface 12 any excess adhesive moves to the edge of the bevel and the same moves onto the template 26 around the aperture 28. The template 20 is then removed and the template 26 is retained in positioned and the curing medium is then applied as detailed in FIG. 6. When cured the excess adhesive can be peeled from the template 26 relatively easily.

Figure 6:
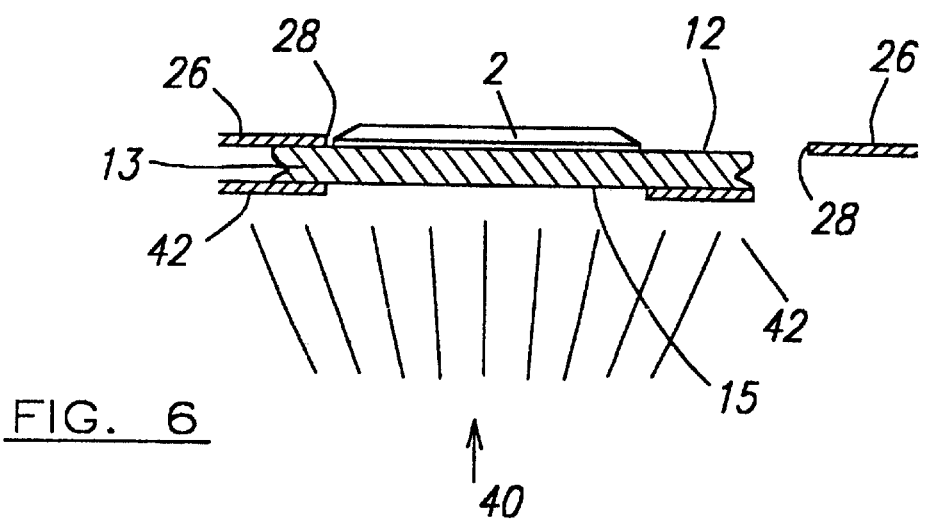
FIG. 6 shows the application of the curing medium.

The curing medium, in the form of a photo initiating light source 40, is applied from the direction shown in FIG. 6. This cures the adhesive in contact with the bevels to bond the bevels to the surface, and acts on the level face of the rear surface 4 of the bevels, thereby eliminating any reflection problems.

Figure 5:
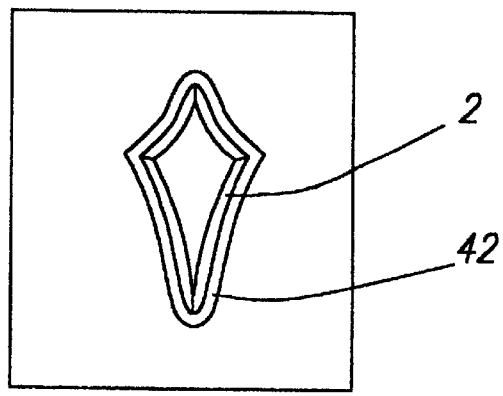
FIG. 5 illustrates an alternative embodiment of creating the effect of FIG. 2.

FIG. 5 illustrates an alternative arrangement where one bevel 2 is first bonded, this being particularly useful for larger bevel clusters. In this method the bevel to be bonded is first positioned on the surface opposing the surface 12 to which it is to be bonded and a darkened area 42 is applied, typically by pen, onto the surface of the shape of the outline of the bevel 2. The bevel is then subsequently removed and placed in position as defined by the ink line, which is relatively thick on the surface 12 to which it is to be bonded. The ink line can be viewed through the sheet material. The bevel is then pressed onto the surface 12 to remove excess adhesive onto the area 42, albeit on the opposing surface, so that when the curing medium is applied the excess adhesive lying in the area 42 is not cured and so allows other bevels to be subsequently moved into abutting arrangement with the bonded bevel. The darkened area can then be removed by cleaning using conventional methods. This process is shown in FIG. 6 wherein the darkened area is shown to be on the opposing surface 15 to the surface 12 to which the bevel is to be bonded.

The remaining bevels 14, 16 18 are then positioned with respect to bevel 2 and template 26 and, if required, the template 20 can be brought back into position. With the remaining bevels in position and each having layers of adhesive between the same and the surface 12, the template 20, if used, is removed and the curing medium 40 is applied to cure the adhesive and hence secure the remaining bevels simultaneously in position with respect to the fixed bevel 2.

Figure 7:
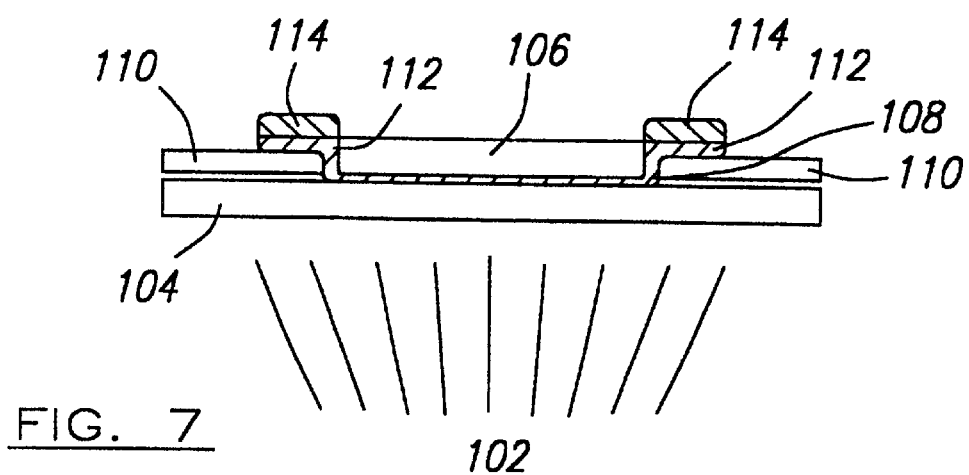
FIG. 7 illustrates curing of a conventional resin adhesive using the template bonding method.

Referring now to FIG. 7, there is shown the template bonding method comprising a photo initiating light 102 applied to a piece of glass 104 to which a bevel 106 is to be attached with a layer of conventional resin 108, portions of which have flowed onto template 110. The light 102 acts to cure the resin 108 but when it passes through the template 110 it is found to only cure the layer 112 of the resin, so that there remains a layer 114 of gel-like, uncured resin which can be unacceptable.

Figure 8:
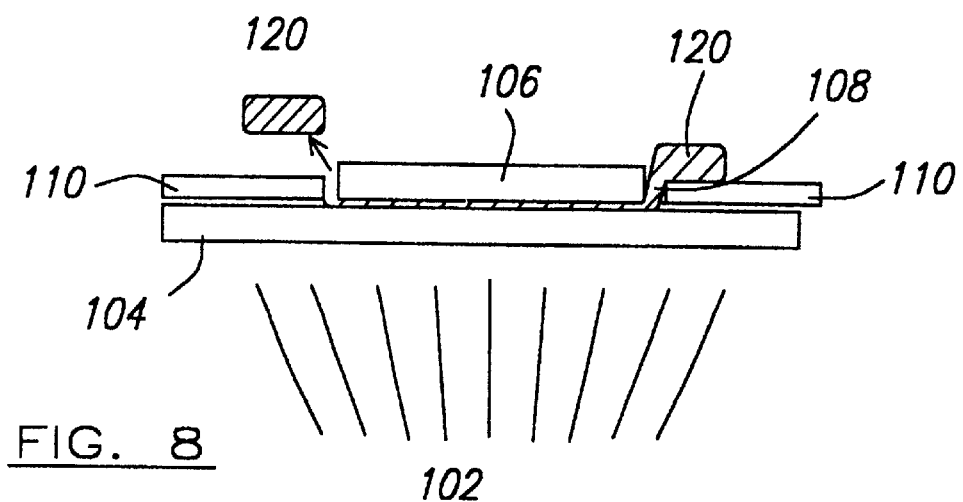
FIG. 8 illustrates curing of a photo initiating resin adhesive according to the present invention.

In contrast, by using the resin formulated in the manner according to this invention as shown in FIG. 8, the resin layer 120 on the template 110 is wholly cured within 20 seconds and can therefore be peelably removed from the template as required.

Thus it will be appreciated that by providing the resin in the form as indicated above, and also linking the composition of the resin to the light source used for curing, then the use of this type of resin is of advantage with the template bevel bonding method.

Thus the invention according to this application provides for the forming of a decorative effect on windows and the like by using clusters of bevels which are applied using an application method and apparatus which is simpler, quicker and more effective whilst maintaining the quality of the bond and visual appearance of the bevels.

What is claimed is:

1. A method of forming a decorative bevel cluster comprising the steps of:

placing a template on a planar surface, said template having an aperture or apertures of a shape which matches that of a required bevel cluster;

placing a plurality of bevels into said template to form a cluster of said bevels thereby achieving a decorative effect on said planar surface, with a layer of adhesive applied between said bevels and said surface;

applying pressure to said bevels to move excess adhesive and/or entrapped air to edges of said cluster of bevels so that excess adhesive at said edges flows onto said template to lie thereon;

applying a curing medium to cure said adhesive to bond said bevels to each other and to said surface;

once said adhesive is cured, scoring around said bevel cluster; and removing said excess adhesive.

2. A method according to claim 1 wherein said template is releasably secured to said surface, at least around a perimeter of said aperture.

3. A method according the claim 2 wherein said template is formed from a plasticised vinyl sheet material.

4. A method according to claim 1 wherein said template is formed from photo-initiating light transmitting plastic sheet material.

5. A method according to claim 1 wherein said aperture in said template is slightly larger than said cluster of bevels leaving an outline therearound.

6. A method according to claim 1 wherein said adhesive is a photo initiating resin which can be throughly cured when on said template planar surface by the application of light from a light source.

7. A method according to claim 6 wherein said resin can be throughly cured within a time of 20 seconds from commencement of curing.

8. A method according to claim 7 wherein said resin includes an initiator component which is responsive to characteristics of said light source.

9. A method according to claim 1 wherein a second template is positioned on a surface opposing said planar surface to which said bevels are applied, and viewable through said planar surface, said template including a series of lines relating to an outline of said bevels and which show relative positions of said bevels.

10. A method according to claim 9 wherein areas between said lines on said second template are darkened, with an outline of said bevels shown as lighter lines, said darkened areas serving to permit foreign matter, trapped air, excess adhesive and the like to be more clearly seen, and said second template being removed prior to curing of said adhesive.

11. A method according to claim 1 wherein said curing medium is applied through said planar surface onto faces of said bevels which are in contact with said planar surface to which they are to be bonded.

* * * * *